United States Patent [19]

Shelton

[11] Patent Number: 5,345,501
[45] Date of Patent: Sep. 6, 1994

[54] TELEPHONE CENTRAL OFFICE BASED METHOD OF AND SYSTEM FOR PROCESSING CUSTOMER ORDERS

[75] Inventor: Norris N. Shelton, Chantilly, Va.

[73] Assignee: Bell Atlantic Network Services, Inc., Arlington, Va.

[21] Appl. No.: 729,762

[22] Filed: Jul. 15, 1991

[51] Int. Cl.$^5$ .................. H04M 1/64; H04M 11/00
[52] U.S. Cl. ............................ 379/89; 379/67; 379/88; 379/97; 379/100; 379/201; 379/105
[58] Field of Search ................. 379/67, 88, 89, 97, 379/201, 100, 217, 105

[56] References Cited

U.S. PATENT DOCUMENTS

| | | | |
|---|---|---|---|
| 4,071,698 | 1/1978 | Barger, Jr. et al. | 379/91 |
| 4,255,619 | 3/1981 | Saito | 379/96 |
| 4,594,476 | 1/1986 | Freeman | 379/76 |
| 4,761,684 | 8/1988 | Clark et al. | 379/105 |
| 4,763,191 | 8/1988 | Gordon et al. | 379/105 |
| 4,797,913 | 1/1989 | Kaplan et al. | 379/94 |
| 4,897,866 | 1/1990 | Majmudar et al. | 379/94 |
| 4,897,867 | 1/1990 | Foster et al. | 379/94 |
| 4,899,369 | 2/1990 | Kondziela | 379/67 |
| 4,943,995 | 7/1990 | Daudelin et al. | 379/67 |
| 4,969,185 | 11/1990 | Dorst et al. | 379/67 |
| 5,193,110 | 3/1993 | Jones et al. | 379/88 |

*Primary Examiner*—James L. Dwyer
*Assistant Examiner*—Fan Tsang
*Attorney, Agent, or Firm*—Lowe, Price, LeBlanc & Becker

[57] ABSTRACT

A telephone central office switch based system for forwarding customer requests to a vendor site and processing orders comprises, in addition to the standard central office switch, a voice response unit (VRU) controlled by an adjunct computer for sending to the telephone of a customer an audible instruction message followed by audible response messages in reply to customer prompts entered by telephone. The VRU/adjunct includes not only data storage for voice messages but also has a separate data storage capacity for storing a data base of customer identification and vendor inventory information. The adjunct computer is in communication with a host computer at each vendor site. The host downloads inventory and customer identification information to the adjunct, and the adjunct uploads information to create and activate an order at the host. To complete the transaction, the host updates inventory information and downloads back to the adjunct.

40 Claims, 8 Drawing Sheets

TELEPHONE CENTRAL OFFICE BASED METHOD OF AND SYSTEM FOR PROCESSING CUSTOMER ORDERS

TECHNICAL FIELD

This invention relates generally to telecommunications, and more particularly to telephone interactive methods and systems for processing customer orders.

BACKGROUND ART

Telephone ordering services currently are available to enable a customer to place a call to a remote vendor and order a particular product or service by code or other description. Whereas systems generally require human operator involvement, recent developments have implemented voice response units that supply pre-programmed messages to the caller in accordance with responses entered through telephone touch-tone key pad or by speech recognition.

Such systems have been applied in so-called pay-per-view wherein video programming is made available to a customer upon request by telephone. See, for example, Foster U.S. Pat. No. 4,897,867 et al. wherein the central office switch collects and processes customer order data from a requesting customer telephone line and supplies a desired selection to be viewed by the customer through a particular cable television channel. Identity of the customer is automatically forwarded over the vendor data link along with customer order.

Other patents of which I am aware that disclose machine implemented telephone line order placement services are Daudelin U.S. Pat. No. 4,943,995 et al.; Caplin U.S. Pat. No. 4,797,913 et al.; Kondziela U.S. Pat. No. 4,899,369; Clock U.S. Pat. No. 4,761,684 et al.; Gordon U.S. Pat. No. 4,763,191 et al.; Barger Jr. U.S. Pat. No. 4,071,698 et al.; Majmudar U.S. Pat. No. 4,897,866 et al.; McCalley U.S. Pat. No. 4,792,849 et al. and Freeman U.S. Pat. No. 4,594,476.

All of the above-noted telephone line interactive systems are disadvantageous in various respects. For example, the system described in the Foster et al. patent requires modification of the central office switch controller to forward customer orders to vendor data links. Further, none of the conventional systems enable the vendor to adequately carry out inventory management, e.g., to query inventory on hand at the vendor site and to report on inventory status, etc. verbally and automatically to the customer. In addition, there is no provision in prior art telephone interactive systems to inform the vendor as to the number of times any selection was reported to the customer as being out of stock.

Data base management by the vendor also is very difficult to carry out in conventional systems, as the amount of memory storage capacity available at the host computer, installed at each vendor site, is limited. Access to the host by the remote customer must be minimized because the host ordinarily will be engaged in processing transactions at the vendor site.

DISCLOSURE OF THE INVENTION

Accordingly, one object of the present invention is to forward and process customer orders via telephone while avoiding disadvantages of the prior art.

Another object of the invention is to forward and process customer orders through a telephone network central office without modification of the central office switch.

Another object is to improve machine-implemented voice interactive customer order processing via telephone.

Still another object of the invention is to carry out improved inventory control and reporting to customers via telephone within a machine implemented customer order processing system.

A further object is to minimize data storage at vendor sites in a machine-implemented voice interactive order processing and inventory reporting via telephone.

The above and other objects are satisfied by the invention which, in one aspect, is in the form of a telephone central office switch based telecommunications system for forwarding customer requests to vendor sites and processing orders. The system preferably comprises a voice message system platform (VMS) associated with an adjunct computer at a central office for sending to the telephone of a customer an audible instruction message followed by audible response messages based upon customer prompts entered by telephone keypad.

A host computer at each vendor site, storing product or service inventory information, is linked to the adjunct at the central office. A central office switch controlled by a dedicated central office computer and serving a plurality of lines establishes connections between the (VMS) platform and customer telephone lines. The VMS platform preferably includes two separate memory regions. The first region of memory stores preprogrammed messages to be sent to customers. The second stores customer identification and inventory information downloaded from vendor sites. Programming of the adjunct and host computers enables downloading customer identification and vendor inventory information from the host to the adjunct and uploading information to create and activate customer orders.

Implementation of the adjunct computer at the switch avoids any necessity to alter the standard central office computer, a characteristic of related prior art systems, and provision of memory capacity at the platform sufficient to store data base data reduces storage burden at the host.

In accordance with another aspect of the invention, the adjunct computer further is in communication with a credit card validation center. The public data network (PDN) or data links may be used to communicate with the credit card validation center.

As another feature of the invention, information at the vendor site is transmitted on-line to the adjunct computer, and customer transaction reports, optionally in the form of facsimile transmissions, may be supplied by the adjunct to the vendor.

In accordance with another aspect of the invention, the telephone network may comprise an integrated services digital network (ISDN) including caller number identification means for detecting customer identification by receiving and processing automatic number information (ANI) signals. The adjunct may be programmed to be responsive to customer ID for generating customer billing automatically.

Another aspect of the invention contemplates means implemented by the adjunct computer for downloading audio or video program material to a customer. The adjunct may be programmed to download video program material from the host and store the video material in a data base at the VMS. Video material is downloaded from the adjunct to a customer on demand.

A further aspect of the invention provides programming of the adjunct computer to store at the platform a data base of customer orders unfilled as a result of "out of stock" vendor inventory. The adjunct may be further programmed to report to the customer the estimated date of arrival of the depleted stock item. A data base of inventory remaining available to customers may be maintained at the platform which will automatically send to the host a message requesting an increase in inventory when the remaining inventory is reduced to a predetermined target inventory.

The adjunct computer may further be programmed to send to the customer an "inventory depleted" message if the remaining inventory is reduced to the predetermined target inventory and the host does not make additional inventory available to the adjunct.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
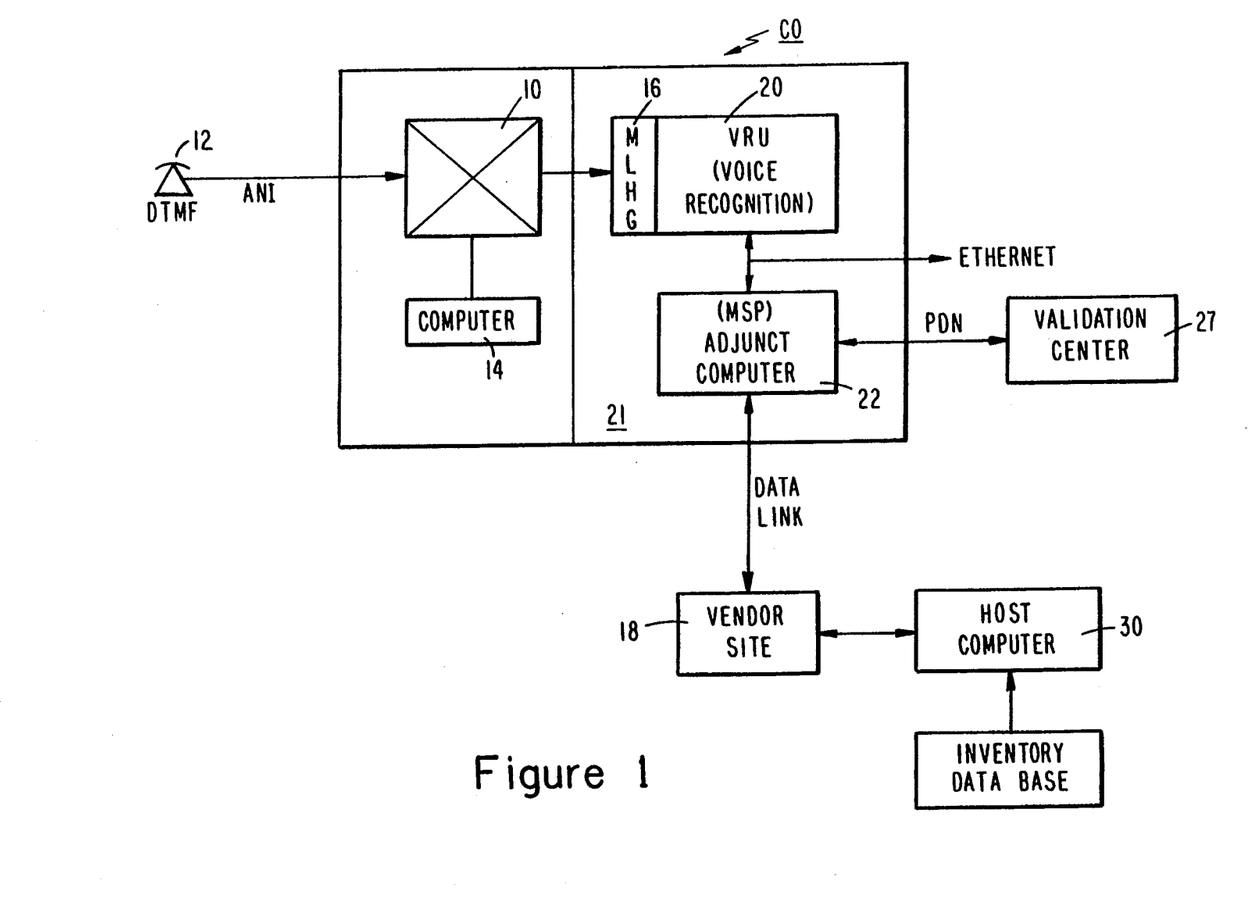
FIG. 1 is a system block diagram of a preferred embodiment of the invention.

Referring to FIG. 1, there is shown a program controlled electronic switch (5ESS, 1AESS, etc.) 10 at a central office (CO) connected in a public switched telephone network to a telephone station 12. Switch 10 is controlled by a dedicated central office computer 14 in accordance with stored programming in the usual manner. A call from a customer telephone 12 will be incoming on an assigned number for a multi-line hunt group (MLHG) 16 to a voice response unit (VRU) at the central office. A vendor at site 18 will purchase the number and type of access lines needed in the MLHG 16.

Figure 2:
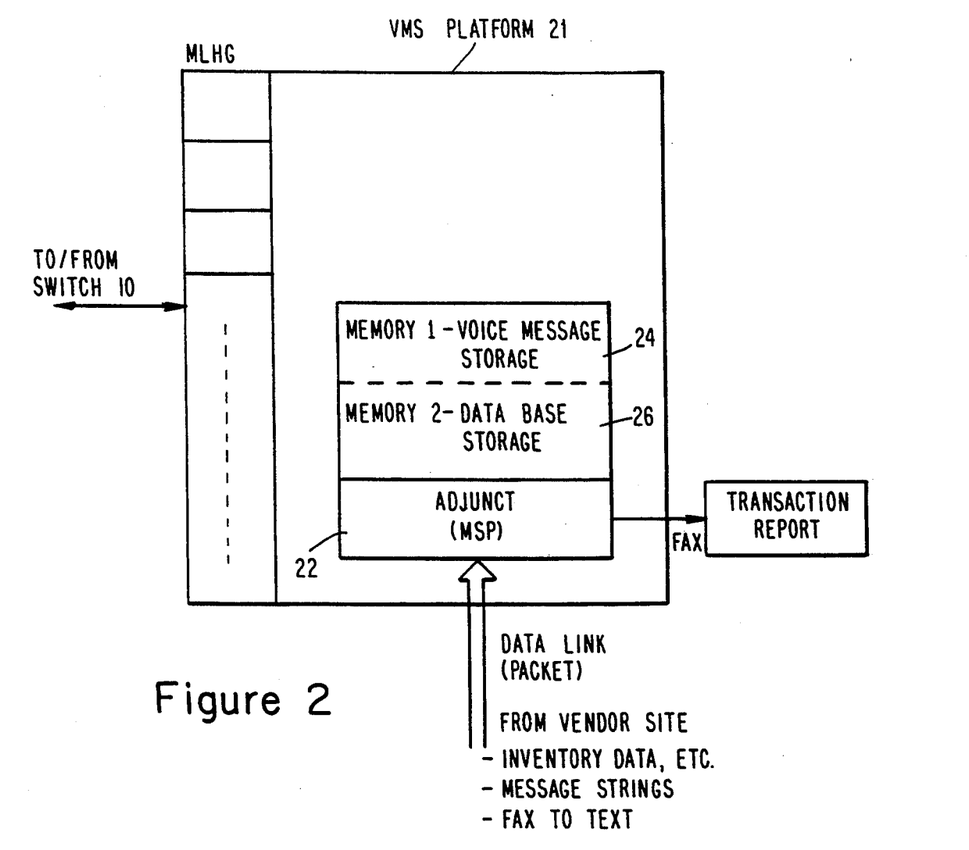
FIG. 2 is a detailed break-out of the Voice Response Unit (VRU) of FIG. 1.

By way of example, the VRU 20 may be a VOCOM 40 mid-range, high performance voice processing system manufactured by Perception Technology of Canton, Massachusetts. The VRU 20 provides the caller with an announcement and description of service followed by prompts for accessing the available menus and ordering desired products or services. The VRU 20, incorporated within a voice message system (VMS) platform 21, shown in more detail in FIG. 2, is controlled to generate audio messages in response to signals generated by a multi-services platform (MSP), or adjunct computer, 22. Associated with the adjunct 22 are two memories or memory regions 24, 26. The first memory 24 stores predefined messages to be sent to the customer in response to customer key pad entered prompts. The second memory 26 stores information downloaded from the host computer 30 of a vendor, such as the identifications of authorized customers as well as data on available inventory. VMS platform 21 is connected via a T1 link (not shown) to the MLHG 16 associated with switch 10.

An example of adjunct computer 22 is a Sequoia Model 200. The adjunct computer 22 stores in memory 26 data such as customer file information that has been downloaded from the vendor site. This data will include a password or PIN along with credit card information for participating customers of that vendor. The adjunct 22 may also be linked via a public data network (PDN) to a bank credit card validation center 27, as shown in FIG. 1. If the customer entered PIN is correct, and credit card validation is successfully carried out, the VRU 20 presents an informational and transactional menu to the caller.

The use of the adjunct computer 22 for storing data is necessary because vendors usually have PCs or minicomputers with limited storage capacity. If the adjunct computer were to require real time access to the host 30 at the vendor site, there will be interference with ongoing transactions between vendor personnel and customers in the store.

Figure 5:
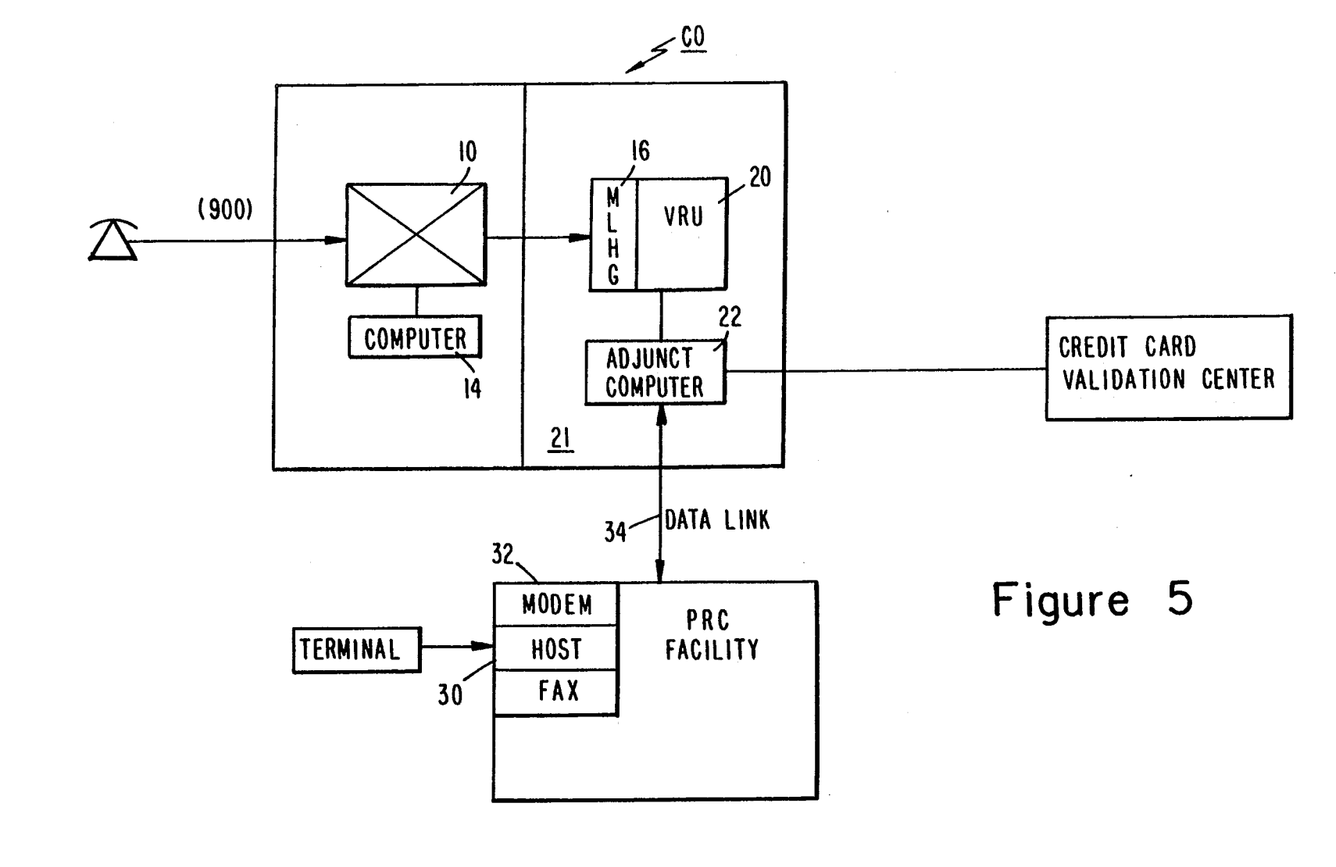
FIG. 5 is a diagram showing how the invention may be implemented within a video tape sales/rental distribution system.
Figure 7:
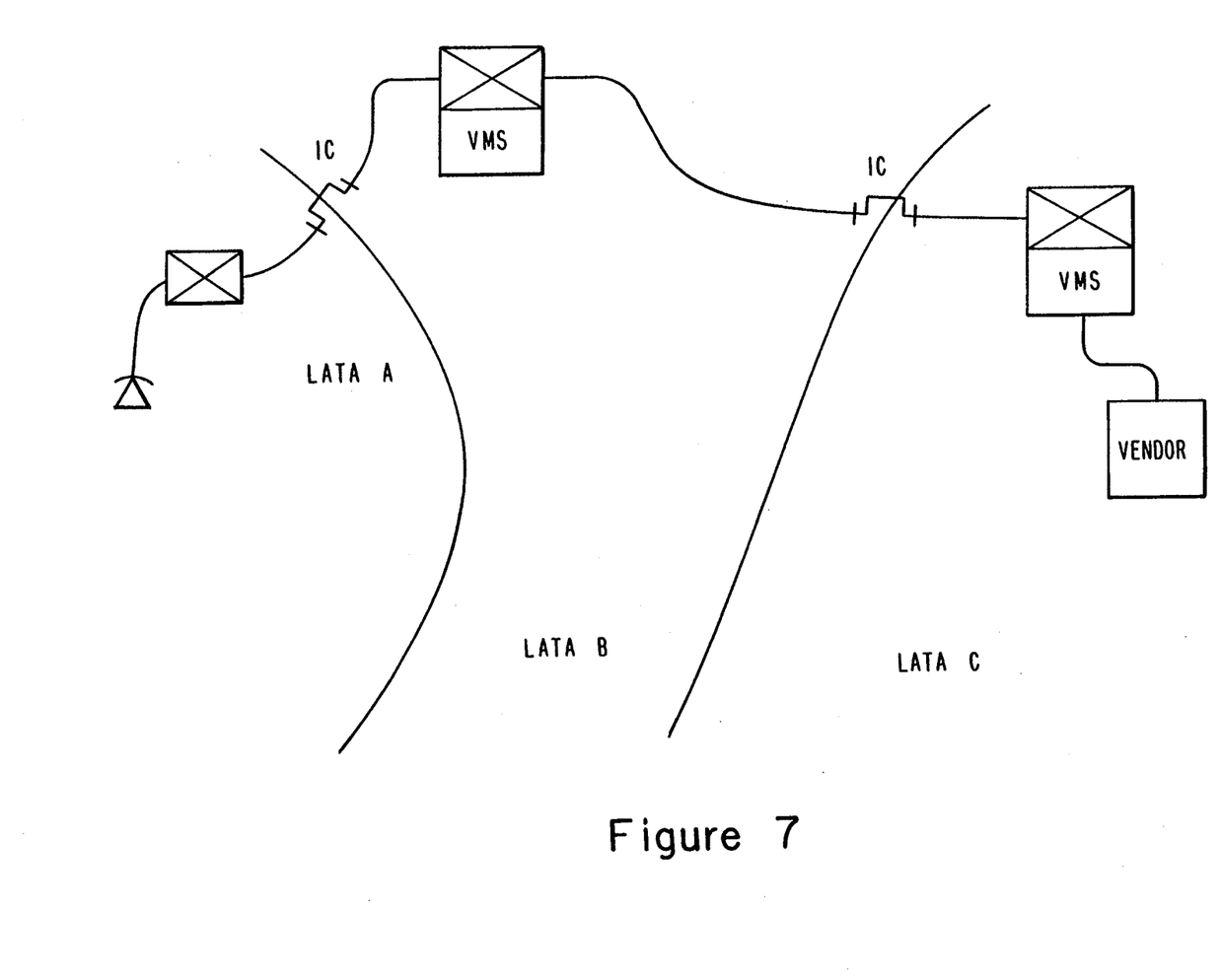
FIG. 7 depicts operation of the system of this invention within a Local Access and Transport Area (LATA) switching network.

An example, shown in FIG. 5 wherein similar numerals are used for corresponding elements of FIG. 1, is a video store providing rental and sales of prerecorded cassettes (PRC) and video accessories at a PRC facility. The PRC facility houses host 30 in the form of a minicomputer that is placed on-line through a modem 32 and data link 34 to the adjunct computer 22 at a local central office (CO). This network architecture enables transactions to be carried out between the vendor and customer through local telephone service. However, with reference to FIG. 7, transactions can be carried out throughout different exchanges between a Local Access and Transport Area (LATAs) using interexchange carriers (IC) as shown.

Figure 3:
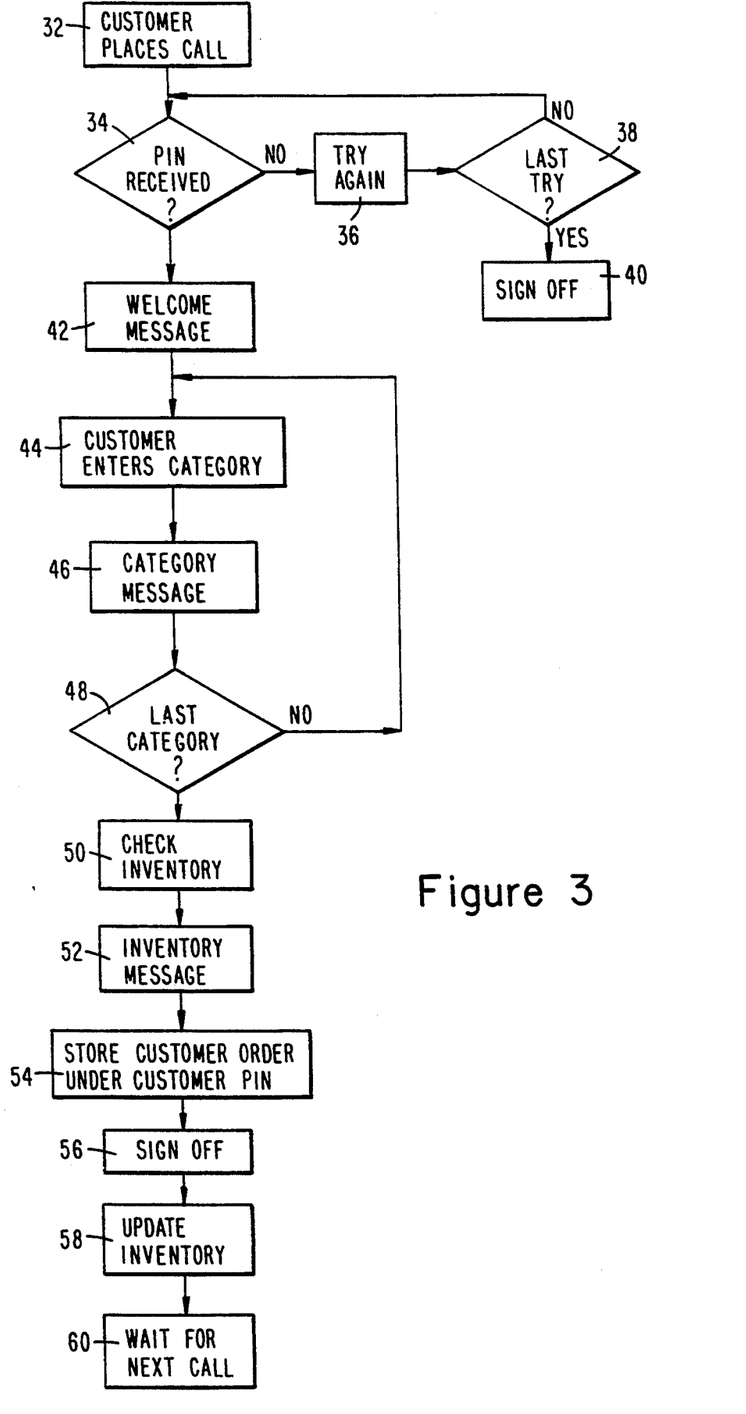
FIG. 3 is a flow chart showing operation of the preferred embodiment of the invention.

To place an order, the procedure shown in FIG. 3 is carried out wherein the customer first places a call to the video store (step 32), and is asked to enter his personal identification number (PIN). This message is generated by VRU 20 in accordance with the contents of memory 24 at the adjunct 22. The customer enters the PIN at the DTMF keyboard of his telephone (step 34), and the PIN is compared with numbers in a data base, previously downloaded by the vendor and stored in memory region 26 shown in FIG. 2. If the PIN entered by the customer does not match with a valid PIN stored at the adjunct computer, the customer is prompted to try again (step 36). If there again is no match, and this may be repeated a predetermined number of times (step 38), the call is disconnected (step 40).

However, assuming that the correct PIN is entered by the customer, a welcome message is sent by VRU 20

(step 42). This message, pre-programmed by the vendor, is stored in memory region 24, and may be changed by the vendor via telephone downloading or conventional fax-to-text processing.

In response to a verbal prompt, the customer selects a category of product or service by entering appropriate data through the telephone DTMF keypad or via speech recognition, and a reply message, confirming the category selected, is sent to the customer (step 46). The customer will also select successive subcategories, as requested. When selection of the last sub-category is made (step 48), the adjunct checks inventory (step 50). This is done by accessing memory 26 or sending an inquiry to the host computer 30 via data link 34 to check based on more current inventory data (step 50). An inventory message, such as "your order has been accepted" or "the item you requested is out-of-stock", etc., is sent to the customer (step 52).

Assuming that the requested item is in stock, the order is stored under the customer's PIN (step 54) and made available to the customer for pick-up at the store. A receipt is automatically printed at the pick-up site, and may optionally be automatically mailed to the customer or transmitted by facsimile. A sign-off message is sent to the customer (step 56). Inventory data is updated at the host computer (step 58), and the adjunct is readied for the next call (step 60).

An example of machine generated voice interactive dialogue in the example of a video store is given below.

Hello, Express-Vu Response Line. This unique information service offered by Bell Atlantic will allow you to get information on video cassettes currently in stock for sale or rent. In addition you can hear information on coming attractions, our top attractions now in stock as well as video equipment.

To proceed please enter your 4 digit PIN number now Thank you.

To choose a specific category of interest please press the appropriate button on your touch tone pad. For new releases press 1.

To get information about new video cassettes for sale please press 1.

Video cassettes for sale now include the following categories. Press 1 for adventure films; press 2 for üdramas; press 3 for comedies; and press 4 for kid or juvenile films.

The first selection in the category of adventure films is Dick Tracy. If you wish to purchase this item press 6. If you wish to move on to the next selection press 7.

The next selection is "Dark Man". If you wish to purchase this item press 6. If you wish to move on to the next selection press 7.

The next selection is "Navy Seals". If you wish to purchase this item press 6. If you wish to move on to the next selection press 7.

The next selection is "Die Hard II". If you wish to purchase this item press 6. If you wish to move on to the next selection press 7.

The item you have selected is currently available in stock.

You have reached the last item in this category. Any selections you have made will be saved for you under your PIN number and will be available in the store for your pick up at your convenience.

For a listing of coming attractions press 2. For a listing of top attractions press 3. For information about video equipment press 4.

In order to speak to a live in-store attendant press 9 If you wish to exit this program at this point press 66.

Figure 4A:
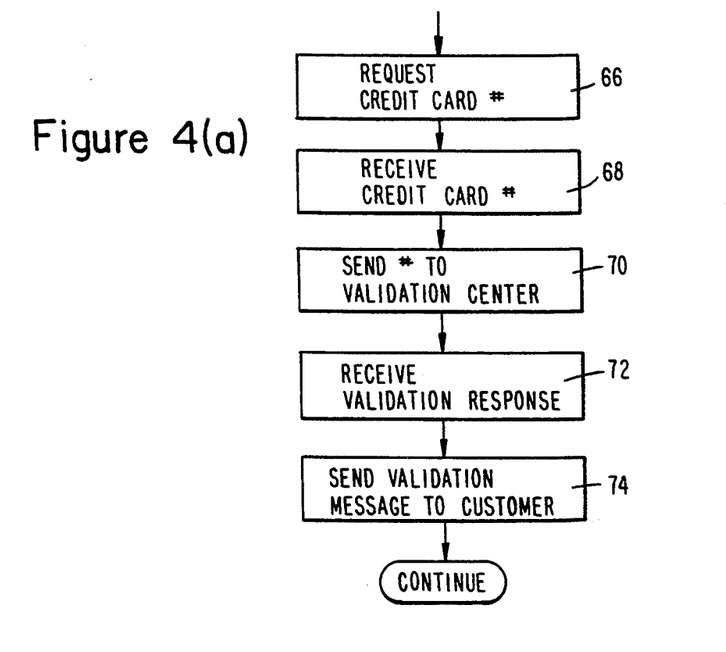
FIGS. 4(a)-(d) are diagrams showing additional aspects of the invention.

The credit card validation sequence, shown in more detail in FIG. 4(a), is initiated with an inquiry to the customer as to the method of payment. Preferably, payment will be made by credit card, and in this event, indicated by the customer by forwarding a response by key pad, the credit card number of a customer is requested (step 66). The customer supplies his/her credit card number by entering a sequence of numbers at the telephone key pad (step 68). The credit card number is relayed to the credit card validation center via the public data network (PDN), step 70, and assuming that the credit card is valid, a validation response is received by the adjunct (step 74). If the credit card is not validated, an appropriate message is sent to the caller.

Alternatively, customer billing can be carried out by the telephone company via a special exchange (e.g., "900"), shown in FIG. 5, or by billing through automatic number identification (ANI), a function conventionally provided by the central office (CO) shown in FIG. 1.

Figure 8:
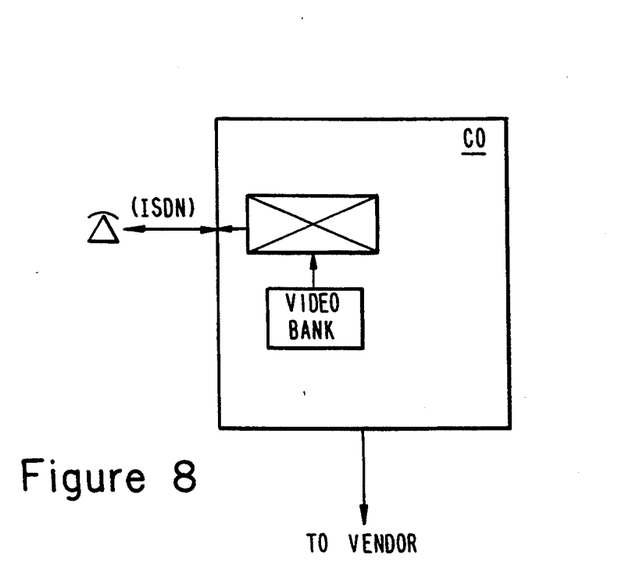
FIG. 8 is a diagram of an embodiment of the invention wherein video program material is downloaded to the customer via a fiber optic line.

Although the example previously given provides sales and rentals of video cassettes for customer pick-up at a video store, the same principles can be applied to enable downloading to a customer of video program material. For example, FIG. 8 depicts an example wherein the central office of a telephone company or video vendor stores a bank of video program material, downloaded to each customer upon demand through a very high speed data transmission network, such as an integrated services digital network (ISDN) and/or a fiber optic line.

Figure 4B:
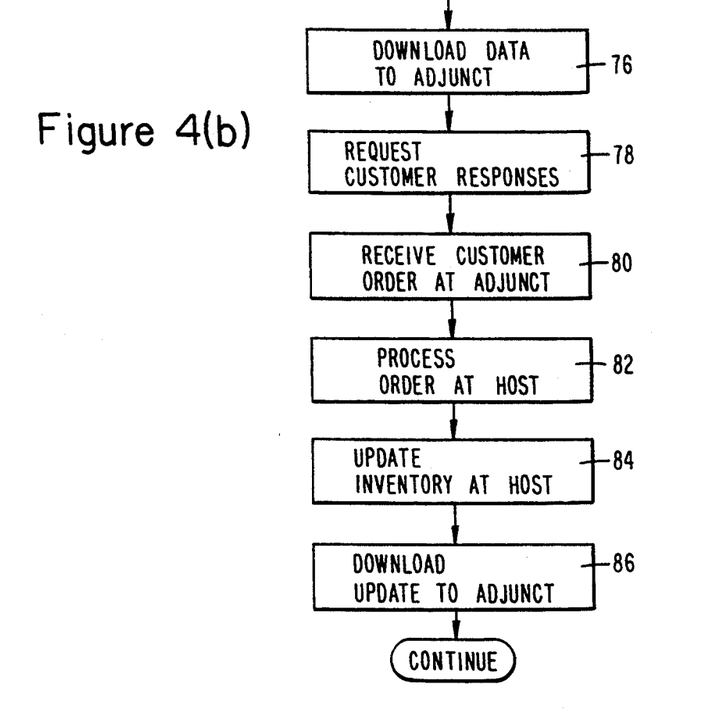

Inventory control is depicted in the sequence shown in FIG. 4(b), wherein step 76 initially downloads data, such as the customer identification and inventory information, to the adjunct computer 22 at the central office (CO). The adjunct 24 controls VRU 20 to request customer responses, e.g., identifying the categories and sub-categories of products and services desired (step 78). Customer orders, received at the adjunct (step 80) are processed at the vendor host (step 82). Inventory data at the host is updated to reflect the current order (step 84), and the updated data is downloaded to the adjunct (step 86). This enables the adjunct computer 22 to report inventory status to the customer in accordance with the sequences depicted in FIGS. 4(c) and 4(d) described below.

Figure 4C:
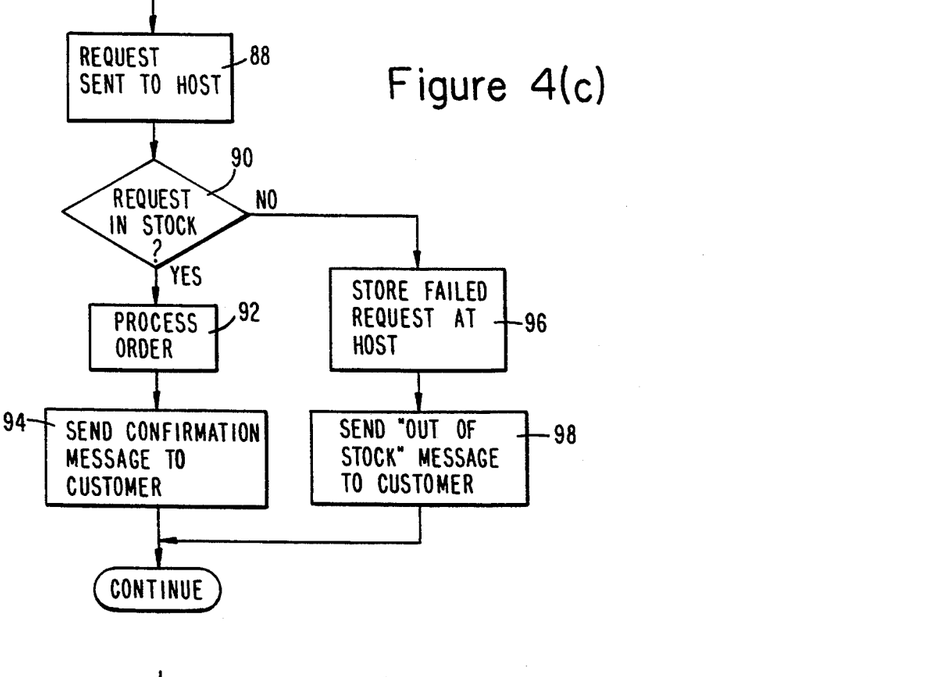

In FIG. 4(c), following request to the host (step 88), the current inventory, stored within the data base of memory region 26, is queried to determine whether the requested merchandise is in stock (step 90). Assuming that the merchandise is found to be in stock, the order is processed at the host (step 92) and the product or services made available to the customer for pick-up at the vendor site or mailing. A confirmation message is sent to the customer in step 94 providing information and requesting the customer to place further orders, if desired.

However, assuming that the item requested is determined not to be in stock, step 90, an indication that a particular item was ordered, but not found in inventory, is stored in data base 26, and VRU 20 is controlled to send an "out-of-stock" message to the customer. The data base 26 can be used by the vendor to carry out inventory control, i.e., by enlarging the stock of the particular item in future inventory, depending upon the number of times that the item was ordered but not filled.

Figure 4D:
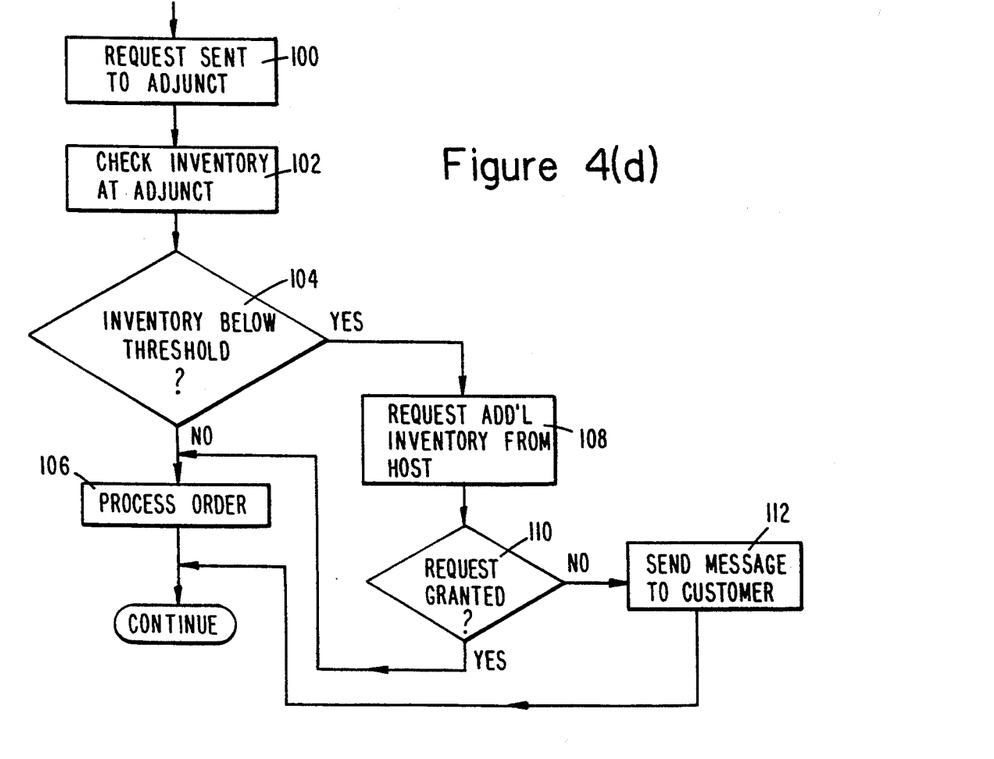

Inventory control is further maintained by the sequence of FIG. 4(d), wherein a customer request is received by the adjunct computer at step 100, and the current inventory, maintained in the data base of memory region 26, is checked (step 102) for availability. If the number of pieces in inventory is determined to be above a predefined threshold inventory (step 104), the order is processed (step 106). However, if the number of items in inventory is determined to be below the threshold, the adjunct computer requests the host to release more inventory to customers at the vendor site. This scenario may occur when a video store, for example, develops a policy to release only a certain number of copies of a particular video cassette to telephone customers while retaining the remainder available to store customers. The video store has the option to release additional copies to video customers when the inventory available to telephone customers becomes nearly depleted. If a request to increase the inventory to telephone customers is granted, step (110), the order is processed. Otherwise, an "out-of-stock" message or other suitable message is sent to the caller (step 112). An indication of an unfilled order may optionally be provided to the data base at memory region 26 of the adjunct computer 22, in the manner described for FIG. 4(c).

Figure 6:
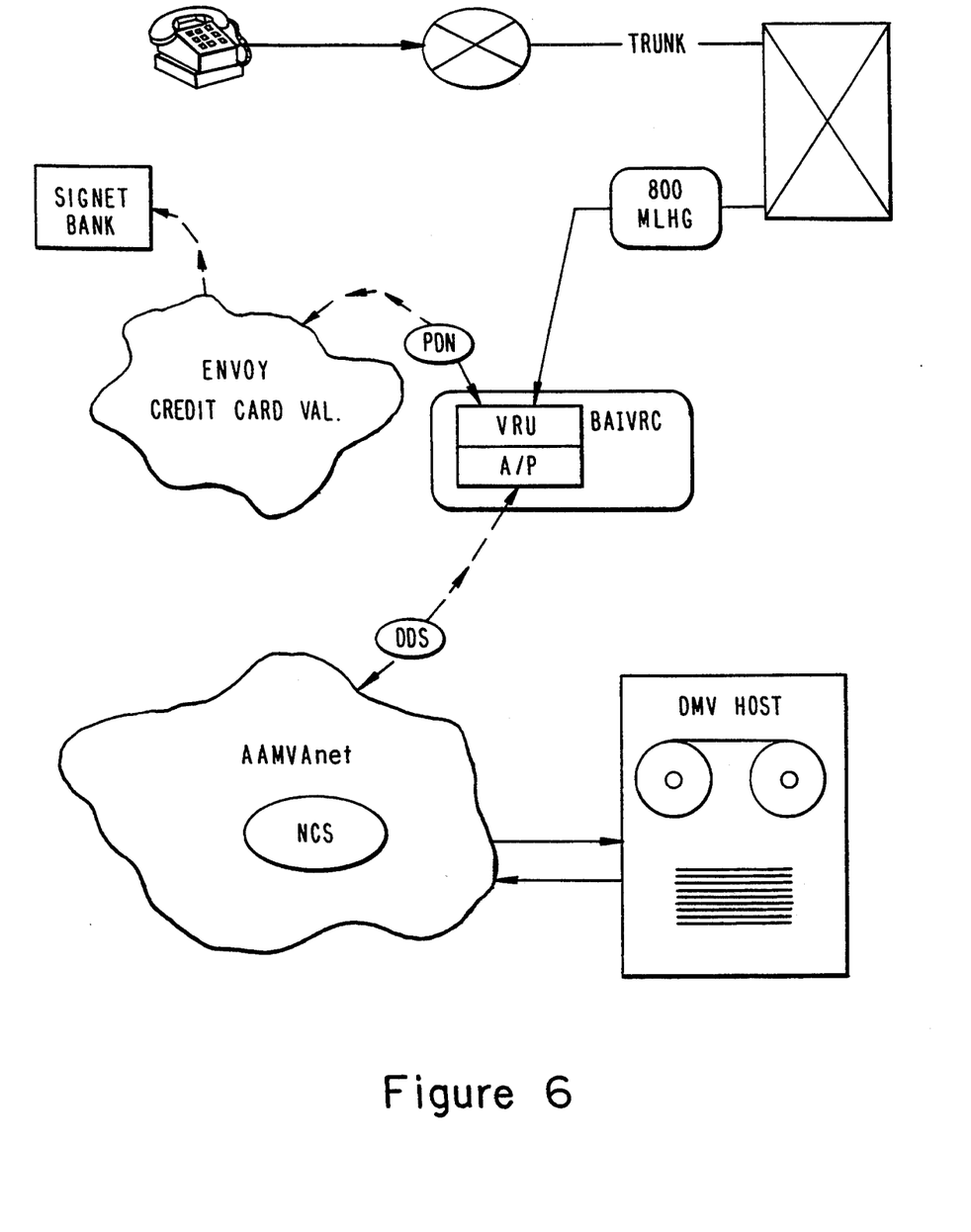
FIG. 6 is a diagram showing how the invention may be implemented within a system for renewing motor vehicle tags.

Another example, shown in FIG. 6, enables callers to place orders with Departments of Motor Vehicles (DMV) for license plate renewals. In this embodiment, the customer telephone station will link to the adjunct through a switch and multi-line hunt group MLHG, in the manner shown for the embodiment of FIG. 1. Credit card validation is carried out through packet data network (PDN), and orders are applied to a national network for Department of Motor Vehicles, known as "AAMVAnet" via a digital data service (DDS). The order is processed by the appropriate DMV host within the network, and renewed tags are sent to the customer.

The present invention is advantageous in several respects. Because the multi-services platform is provided at the central office in the form of an adjunct computer, no programming or alteration of the central office switch is necessary, a solution that is considerably more economical than those requiring central office switch modifications. Because a data base of information associated with customer identification and inventory at the vendor's site may be maintained at the adjunct, processing burden on the host computer is reduced, and the storage capacity required by the host for carrying out interactive processing by telephone is minimized. This frees the host computer to carry out real time customer transactions at the vendor site. Finally, the invention enables the vendor to improve inventory control by maintaining a record of inventory movement including unfilled orders, automatically by data base storage at the adjunct.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. Telephone central office switch based telecommunications system for forwarding customer requests to vendor sites and processing orders, comprising:

voice message system (VMS) platform means including a voice response unit (VRU) at a central office of a telephone network, said VMS platform means including first data storage means for storing and for sending, to the telephone of a customer, an audible instruction message followed by audible response messages in response to customer prompts entered by telephone;

a host computer storing product or service inventory information at a corresponding vendor site;

an adjunct computer associated with said VMS platform means for controlling said VRU, said adjunct computer coupled to said telephone network at said central office and in communication with said host computer;

switch means controlled by a central office computer and serving a plurality of lines for creating connections between said VMS platform means and customer telephone lines, a data link interconnecting said adjunct computer and vendor sites; and means for downloading, from said host computer to said adjunct computer, information on customer identification and vendor inventory, and for uploading, from said adjunct computer to said host computer, information to create and activate an order;

wherein said adjunct computer is further programmed to control said VRU to send to the customer an "inventory depleted" message if remaining inventory is reduced to a predetermined target inventory and the host computer does not make available additional inventory.

2. The telecommunications system of claim 1, wherein said VMS platform means includes second data storage means having stored therein said customer identification and vendor inventory information downloaded from said host.

3. The telecommunications system of claim 1, wherein said VMS platform means further is in communication with a credit card validation center and is programmed to perform credit card validation.

4. The telecommunications system of claim 1, including means for on-line programming from said vendor site information stored in said VMS platform means.

5. The telecommunications system of claim 1, including means at said central office for providing customer transaction reports at said vendor site.

6. The telecommunications system of claim 5, wherein said means for providing transaction reports comprises facsimile equipment at the vendor site.

7. The telecommunications system of claim 1, wherein said telephone network is an integrated services digital network (ISDN).

8. The telecommunications system of claim 7, including caller number identification means at the central office for detecting customer identification number by receiving and processing automatic number identification ANI signals.

9. The telecommunications system of claim 1, wherein said adjunct computer includes programming to compare a customer identification number entered by telephone with stored identification information downloaded by said host computer for customer authorization.

10. The telecommunications system of claim 1, wherein said adjunct computer includes means for downloading audio or video program material to a customer location.

11. Telephone central office switch based telecommunications system for forwarding customer requests to vendor sites and processing orders, comprising:
- voice message system (VMS) platform means including a voice response unit (VRU) at a central office of a telephone network, said VMS platform means including first data storage means for storing and for sending, to the telephone of a customer, an audible instruction message followed by audible response messages in response to customer telephone-entered prompts;
- a host computer storing product or service inventory information at a corresponding vendor site;
- an adjunct computer associated with said VMS platform means for controlling said VRU, said adjunct computer coupled to said telephone network at said central office and in communication with said host computer;
- switch means controlled by a central office computer and serving a plurality of lines for creating connections between said VMS platform means and customer telephone lines, a data link interconnecting said adjunct computer and vendor sites; and
- means for downloading, from said host computer to said adjunct computer, information on customer identification and vendor inventory, and for uploading, from said adjunct computer to said host computer, information to create and activate an order;
- wherein said adjunct computer is further programmed to store a data base of unfilled customer orders as a result of "out of stock" vendor inventory and to send a message to advise the customer on the availability date of an "out of stock" item.

12. The telecommunications system of claim 1, wherein said adjunct computer includes means responsive to an customer order incoming on a predetermined exchange, for generating customer billing.

13. The telecommunications system of claim 8, wherein said adjunct computer includes means responsive to said customer ID for generating customer billing automatically.

14. The telecommunications system of claim 1, wherein said adjunct computer includes means for downloading from said host computer video program material and for storing said video program material in a data base, and means for further downloading said video program material from said adjunct computer to a customer on demand.

15. The telecommunications system of claim 1, wherein said host computer includes means for storing a data base of video program material, and means for downloading said video program material to a customer on demand.

16. The telecommunications system of claim 1, further including means for detecting contents of said customer prompts in the form of DTMF signals.

17. The telecommunications system of claim 1 further including voice recognition means for detecting contents of said customer prompts in the form of voice messages.

18. The telecommunications system of claim 1, including means for connecting to said VMS platform means to Local Access and Transport Areas (LATAs).

19. The telecommunications system of claim 1, wherein said adjunct computer is programmed to supply to the vendor customer usage summary data.

20. The telecommunications system of claim 1, wherein said audible response messages are stored in said adjunct computer using facsimile-to-text equipment.

21. Telephone central office switch based telecommunications system for forwarding customer requests to vendor sites and processing orders, comprising:
- voice message system (VMS) platform means including a voice response unit (VRU) at a central office of a telephone network, said VRU including
- first data storage means or storing an audible instruction message followed by audible response messages entered via telephone by customers that are responsive to particular customer prompts, and
- a host computer programmed with product or service inventory information at each vendor site;
- second data storage means having stored therein customer identification and vendor inventory information downloaded to said host computer;
- an adjunct computer associated with said VMS platform means for controlling said VRU, said VMS platform being coupled to said telephone network at said central office and in communication with said host computer;
- switch means serving a plurality of lines and controlled by a central office computer for creating connections between (1) said VMS platform means and (2) customer telephone lines; and
- means for downloading, from said host computer to said adjunct computer, information on customer identification and vendor inventory, and for uploading, from said adjunct computer to said computer host, information to create and activate an order.

22. A method of ordering products or services by a calling customer using a telephone network based interactive voice service for forwarding customer requests to vendor sites and processing orders, the network including a host computer at each vendor site storing product or service inventory information, a voice message system (VMS) platform means controlled by an adjunct computer at a central office of said network and in communication with said host computer, switch means controlled by a central office computer and serving a plurality of telephone lines; said method comprising the steps of:
- downloading information on customer identification and vendor inventory from a host computer at a particular vendor site to said adjunct computer;
- sending a machine generated audible message requesting telephone keypad entered customer responses with respect to orders for products or services from said adjunct to a customer telephone;
- receiving and processing said customer responses at said adjunct computer;
- sending, from said adjunct computer to the customer machine generated audible reply messages in response to said customer responses entered by telephone;
- uploading, from said adjunct computer to said host computer information to create and activate an order;
- updating inventory information at said host computer in accordance with said order;
- downloading updated inventory information from said host to said adjunct computer;
- maintaining at said adjunct a data base of inventory remaining available to customers; and automatically sending to the host a message requesting an increase in inventory when the inventory remaining is reduced to a predetermined threshold inventory.

23. The method of claim 22, including the step of establishing communication between said VMS platform means and a credit card validation center to perform credit card validation.

24. The method of claim 22, including the step of on-line programming said adjunct computer from said vendor site.

25. The method of claim 22, including the step of transferring customer transaction reports from said platform means to said vendor site.

26. The method of claim 25, wherein said transaction reports are transferred via facsimile transmission equipment.

27. The method of claim 22, wherein said telephone network is an integrated services digital network (ISDN), and including the step of detecting customer identification by receiving and processing automatic number identification (ANI) signals.

28. The method of claim 22, including comparing at said adjunct computer customer identification numbers ID, entered by telephone, with stored identification information downloaded by said host computer.

29. The method of claim 22, including the steps of downloading from said host computer to said adjunct computer audio or video program material, and further downloading said audio or video program material from said adjunct computer to a customer.

30. The method of claim 22, including the step of establishing at said adjunct computer a data base of unfilled customer orders as a result of "out of stock" vendor inventory.

31. The method of claim 22, including generating customer billing data at the central office in response to an customer order incoming on a predetermined exchange.

32. The method of claim 31, wherein said billing data generation is carried out in response to said customer identification.

33. The method of claim 22, including the additional steps of downloading from said host computer to said adjunct computer video program material and storing said video program material in a data base, and further downloading said video program material from said adjunct computer to a customer on demand.

34. The method of claim 22, including storing at said central office a data base of video program material, and downloading said video program material to a customer on demand.

35. The method of claim 22, further including detecting contents of said customer prompts in the form of DTMF signals.

36. The method of claim 22, including interconnecting said adjunct computer and a Local Access and Transport Area (LATA) switching network.

37. The method of claim 22, further including sending from said adjunct computer to the customer an "inventory depleted" message if the remaining inventory is reduced to the predetermined target inventory and the host computer does not make additional inventory available to said adjunct computer.

38. The method of claim 22, including the further step of transferring customer usage summary data from said adjunct computer to the vendor site.

39. The method of claim 37, including the step of sending machine generated message from said adjunct computer to the customer advising the availability date of an "out of stock" item.

40. The method of claim 22, including sending from the vendor site audible response messages to be controlled by said adjunct computer using facsimile-to-text equipment.

* * * * *